US012659032B2

(12) United States Patent
Xue et al.

(10) Patent No.: US 12,659,032 B2
(45) Date of Patent: Jun. 16, 2026

(54) OPTICAL WIRELESS COMMUNICATION BEAM STEERING WITH ASSISTANCE INFORMATION

(71) Applicant: QUALCOMM Incorporated, San Diego, CA (US)

(72) Inventors: Yisheng Xue, San Diego, CA (US); Karoly Becze, Escondido, CA (US); Junyi Li, Fairless Hills, PA (US); Xiaoxia Zhang, San Diego, CA (US); Rajat Prakash, San Diego, CA (US); Jing Sun, San Diego, CA (US); Sam Liu, San Diego, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 18/240,919

(22) Filed: Aug. 31, 2023

(65) Prior Publication Data
US 2025/0080220 A1     Mar. 6, 2025

(51) Int. Cl.
*H04B 10/112*     (2013.01)
*H04B 1/04*     (2006.01)

(52) U.S. Cl.
CPC ....... *H04B 10/1123* (2013.01); *H04B 1/0475* (2013.01)

(58) Field of Classification Search
CPC ................................................. H04B 10/1123
USPC .......................................................... 398/118
See application file for complete search history.

(56) References Cited

U.S. PATENT DOCUMENTS

| | | | | |
|---|---|---|---|---|
| 10,359,570 B1 * | 7/2019 | Belt | ..................... | H04B 10/112 |
| 10,798,715 B2 | 10/2020 | Sturkovich et al. | | |
| 2009/0325479 A1 * | 12/2009 | Chakrabarti | ......... | H04B 7/0417 |
| | | | | 455/7 |
| 2018/0054348 A1 * | 2/2018 | Luo | ....................... | H04B 7/0626 |
| 2019/0082520 A1 * | 3/2019 | Noshad | .................. | H05B 47/19 |
| 2021/0286053 A1 * | 9/2021 | Panas | .................... | G01S 7/4817 |
| 2023/0179465 A1 * | 6/2023 | Lee | ....................... | H04B 7/0617 |
| | | | | 398/118 |
| 2024/0072916 A1 * | 2/2024 | Raghavan | ............ | H04B 17/345 |
| 2024/0154696 A1 * | 5/2024 | Bluschke | ........... | H04B 10/1149 |

FOREIGN PATENT DOCUMENTS

| | | | | |
|---|---|---|---|---|
| WO | WO-2017050197 A1 * | 3/2017 | ............ | H04W 72/23 |
| WO | WO-2022176452 A1 * | 8/2022 | ............ | H04W 16/26 |

(Continued)

OTHER PUBLICATIONS

Kaymak et al; A Survey on Acquisition, Tracking, and Pointing Mechanisms for Mobile Free-Space Optical Communications; IEEE communications, 2018, pp. 1-20. (Year: 2018).*

(Continued)

*Primary Examiner* — Amritbir K Sandhu
(74) *Attorney, Agent, or Firm* — Patterson & Sheridan, L.L.P.

(57) ABSTRACT

Certain aspects of the present disclosure provide a method for wireless communications at a first node, generally including obtaining assistance information using at least one optical sensor and participating in optical wireless communication (OWC) with a second node with beam steering based on the assistance information.

30 Claims, 18 Drawing Sheets

Assistance Info.

(56) References Cited

FOREIGN PATENT DOCUMENTS

| WO | WO-2022189271 A1 * | 9/2022 | ......... H04B 10/1149 |
| WO | WO-2023131541 A1 * | 7/2023 | ........... H04B 10/116 |

OTHER PUBLICATIONS

Sampath et al; A Novel Network Architecture for Indoor Optical Wireless Communication ; Oct. 2019; IEEE, pp. 1-6. (Year: 2019).*

Hussein A.T., et al., "20 GB/s Mobile Indoor Visible Light Communication System Employing Beam Steering and Computer Generated Holograms", Journal of Lightwave Technology, IEEE, USA, vol. 33, No. 24, Dec. 15, 2015, pp. 5242-5260, XP011592717, figures 4-6, p. 5243, line 18-line 21, p. 5245, line 17-line 19.

International Search Report and Written Opinion—PCT/US2024/044057—ISA/EPO—Dec. 10, 2024.

Kaymak Y., et al., "A Survey on Acquisition, Tracking, and Pointing Mechanisms for Mobile Free-Space Optical Communications", IEEE Communications Surveys Tutorials, vol. 20, No. 2, Jan. 1, 2018, pp. 1104-1123, XP011684306, figures 5, 6 p. 1108, col. 2, paragraph 2 p. 1108, col. 2, line 34 p. 1109, col. 1, line 26-line 29 p. 1109, col. 2, paragraph 2 p. 1110, col. 1, line 51-line 52 p. 1110, col. 2, line 16—p. 1111, col. 1, line 12 p. 1112, col. 1, line 5-line 7, p. 1113, col. 1, line 42-line 45.

Pham N.Q., et al., "Automatic Gbps Receiver for Mobile Device in Beam-Steered Infrared Light Communication System", Journal of Lightwave Technology, IEEE, USA, vol. 40, No. 20, Jul. 1, 2022, pp. 6852-6859, XP011924281, abstract, figures 1a, 6,7 col. 4, line 3-line 5.

* cited by examiner

700

750

900

950

1000

1200

1300

1350

1400

1404

SiPM1
1402-1

SiPM2
1402-2

1450

SiPM array

A
1452-A

B
1452-B

1452-C

1452-D

C

D

A method for wireless communications at a first node

Obtain assistance information using at least one optical sensor 1605

Participate in optical wireless communication (OWC) with a second node with beam steering based on the assistance information 1610

1600

OPTICAL WIRELESS COMMUNICATION BEAM STEERING WITH ASSISTANCE INFORMATION

BACKGROUND

Field of the Disclosure

Aspects of the present disclosure relate to wireless communications, and more particularly, to techniques for enhancing beam steering.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first node. The method includes obtaining assistance information using at least one optical sensor; and participating in optical wireless communication (OWC) with a second node with beam steering based on the assistance information.

Another aspect provides a method for wireless communications at a second node. The method includes transmitting assistance information to a first node using at least one optical signal; and participating in optical wireless communication (OWC) with the first node with beam steering based on the assistance information.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for assisted beamforming for optical wireless communications (OWC).

OWC generally refers to a form of communication in which visible, infrared (IR), or ultraviolet (UV) light is used to carry a wireless signal. OWC may be of growing interest to address the limited capacity (and potential need for an expensive license) of more traditional portions of the electromagnetic spectrum, such as radio frequency (RF) spectrum.

Figure 5:
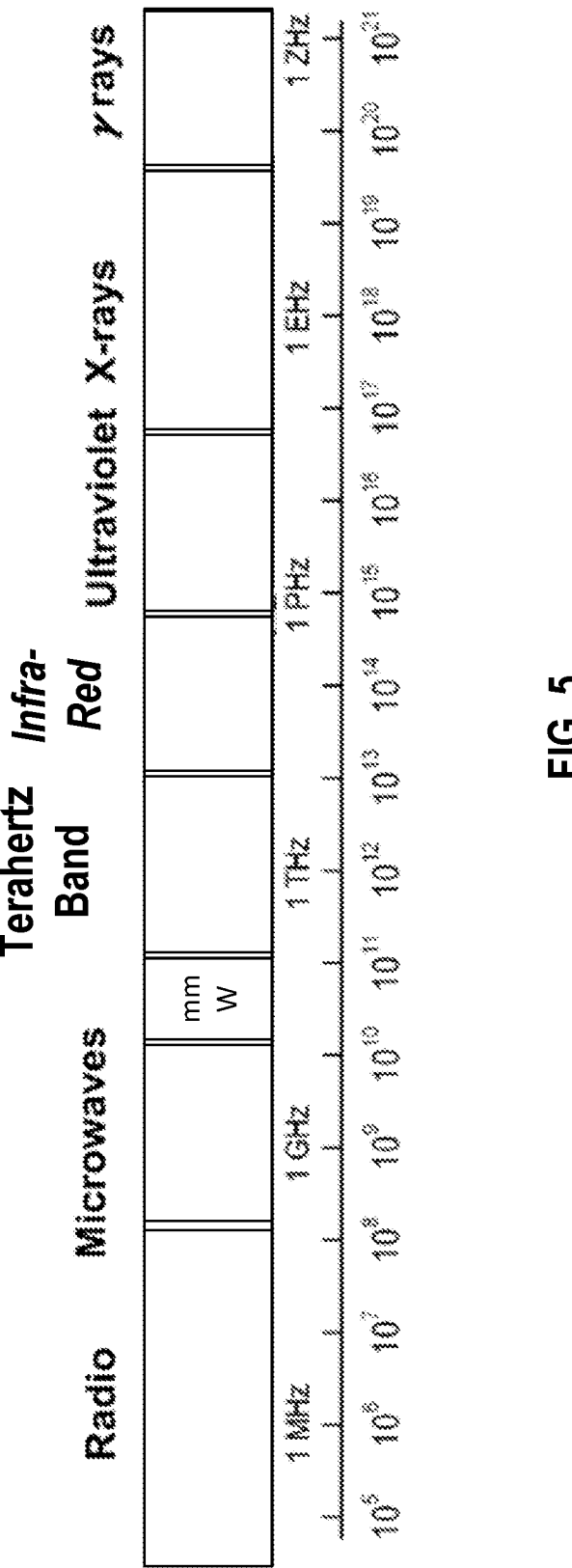
FIG. 5 depicts optical wireless communication (OWC) spectrum.

Such issues may make it difficult for RF spectrum alone to support the high data rates envisioned by advanced systems. For example, systems compatible with 6G and beyond (6G+) may aim to support data rates of 1 Tbps per link for certain use cases (e.g., indoor use cases such as industrial/factory settings). OWC spectrum (including 10^13 Hz-10^16 Hz, as illustrated in graph 500 of FIG. 5) may be considered to help achieve the target data rates of advanced systems, such as 6G+.

In some cases, different types of beams may be used for different purposes. For example, relatively wide beams may be used to achieve relatively moderate data rates (e.g., 400 MHz bandwidth) with devices with relatively low mobility (e.g., ≤3 km/h), while relatively narrow beams may be used to achieve relatively high data rates (e.g., ≥1 GHz bandwidth) with devices with higher mobility (e.g., ≥3 km/h). One potential issue in achieving high data rates is the need to perform beam steering to ensure that narrow beams used for high throughput are aimed properly as a device being served moves. Performance of such efforts may be measured in terms of receiver-side error vector magnitude (EVM). EVM generally refers to the difference between received and ideal constellation points and may be calculated by measuring a root means square (rms) of all error vector magnitudes between the received symbol locations and their closest ideal constellation locations.

Aspects of the present disclosure provide techniques for enhancing beamforming in systems utilizing OWC. As will be described in greater detail below, assistance information may be obtained and used to enhance beam steering based OWC. For example, the assistance information may be rapidly obtained using one or more optical sensors, to efficiently update direction of a beam used in OWC. As a result, increased data rates may be achieved and maintained even as a device moves.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
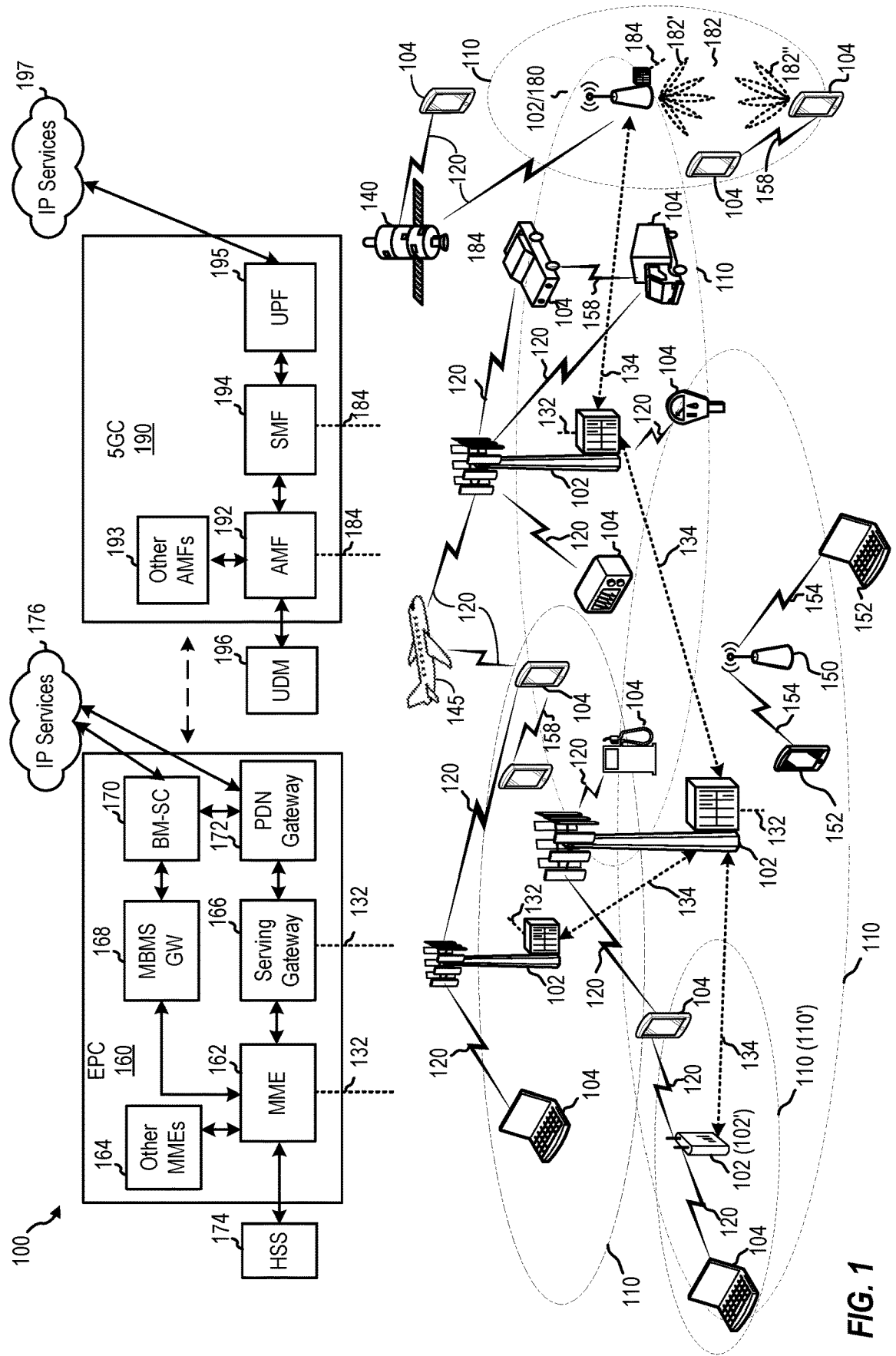
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
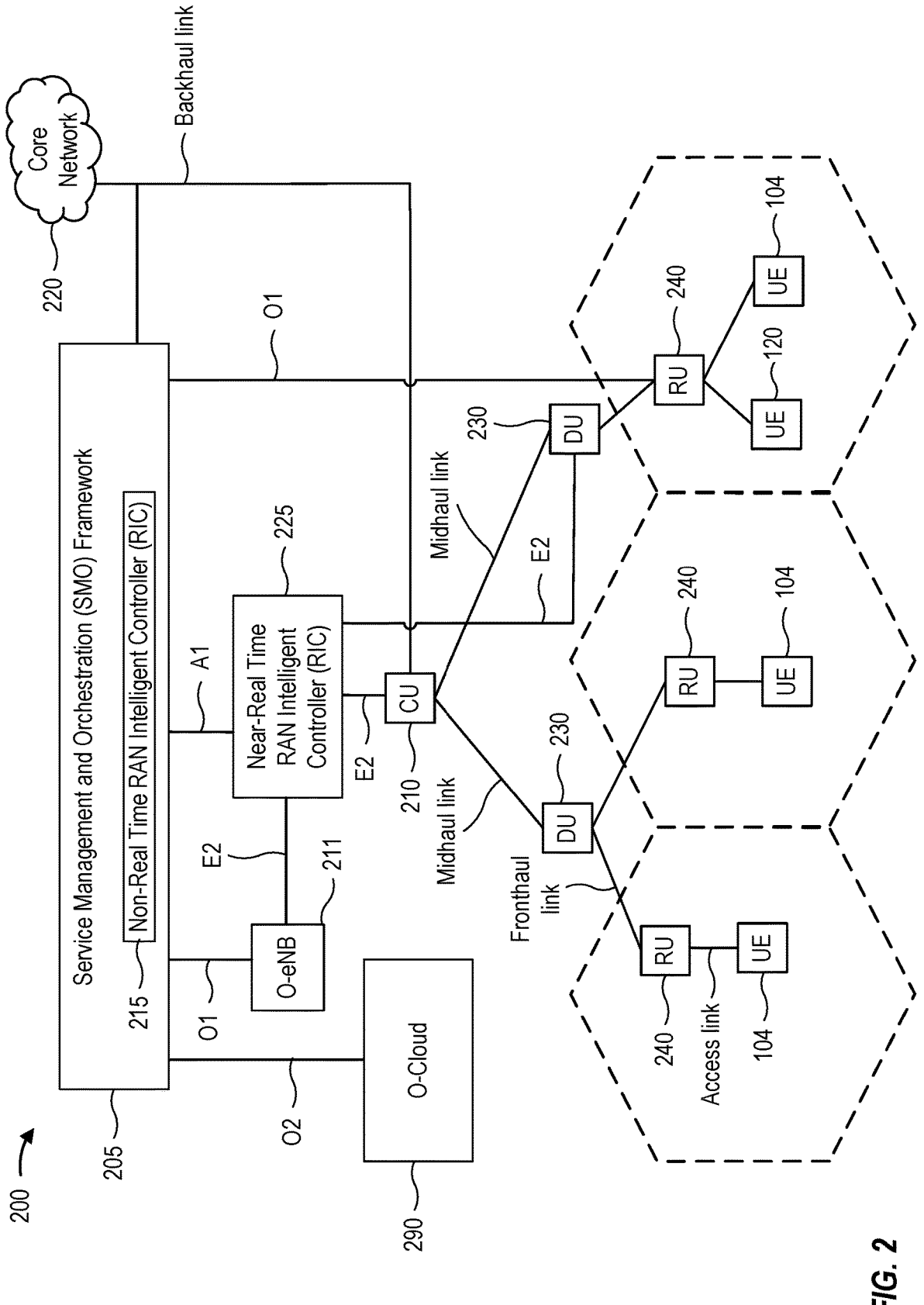
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs)

152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
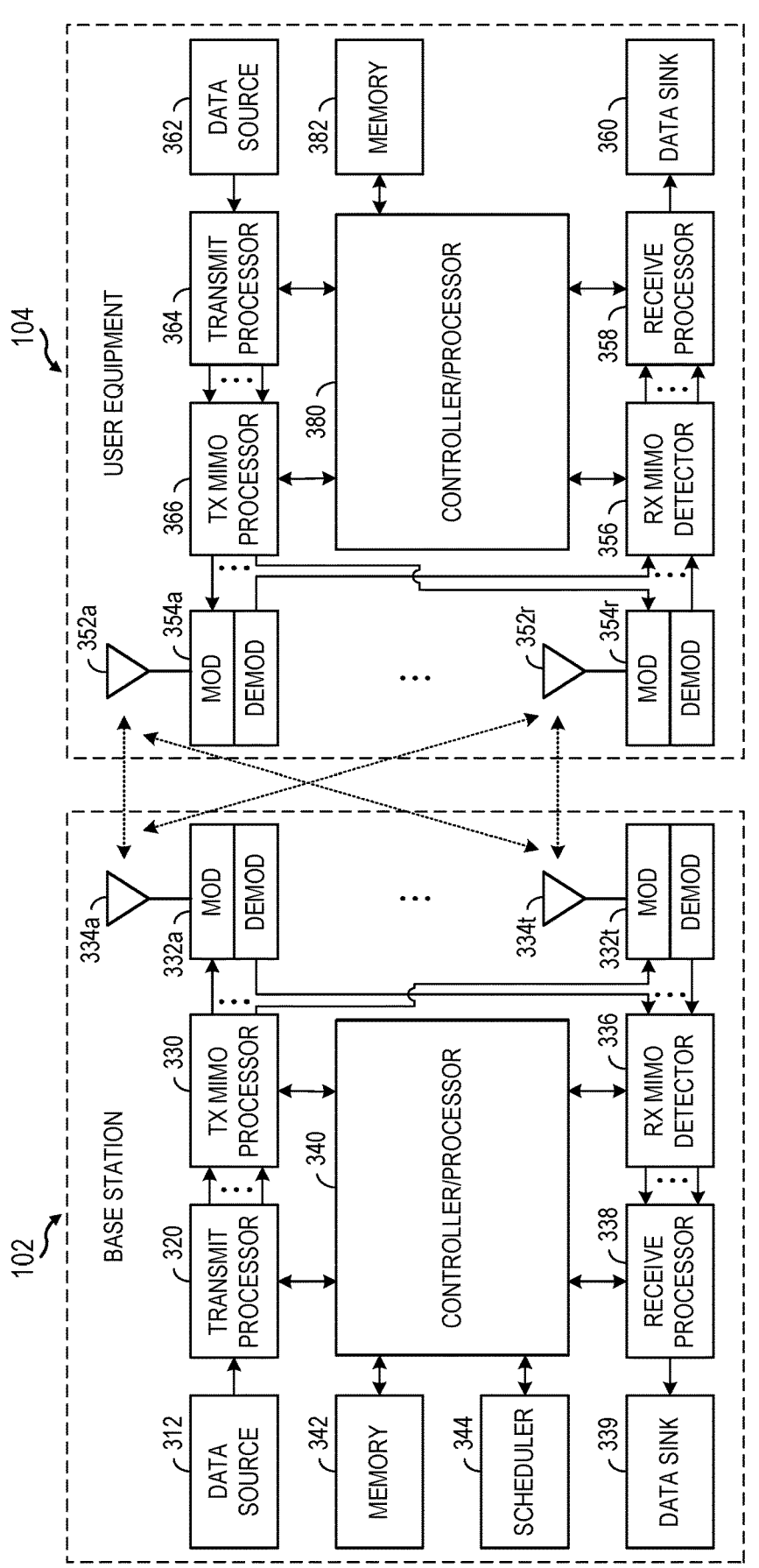
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
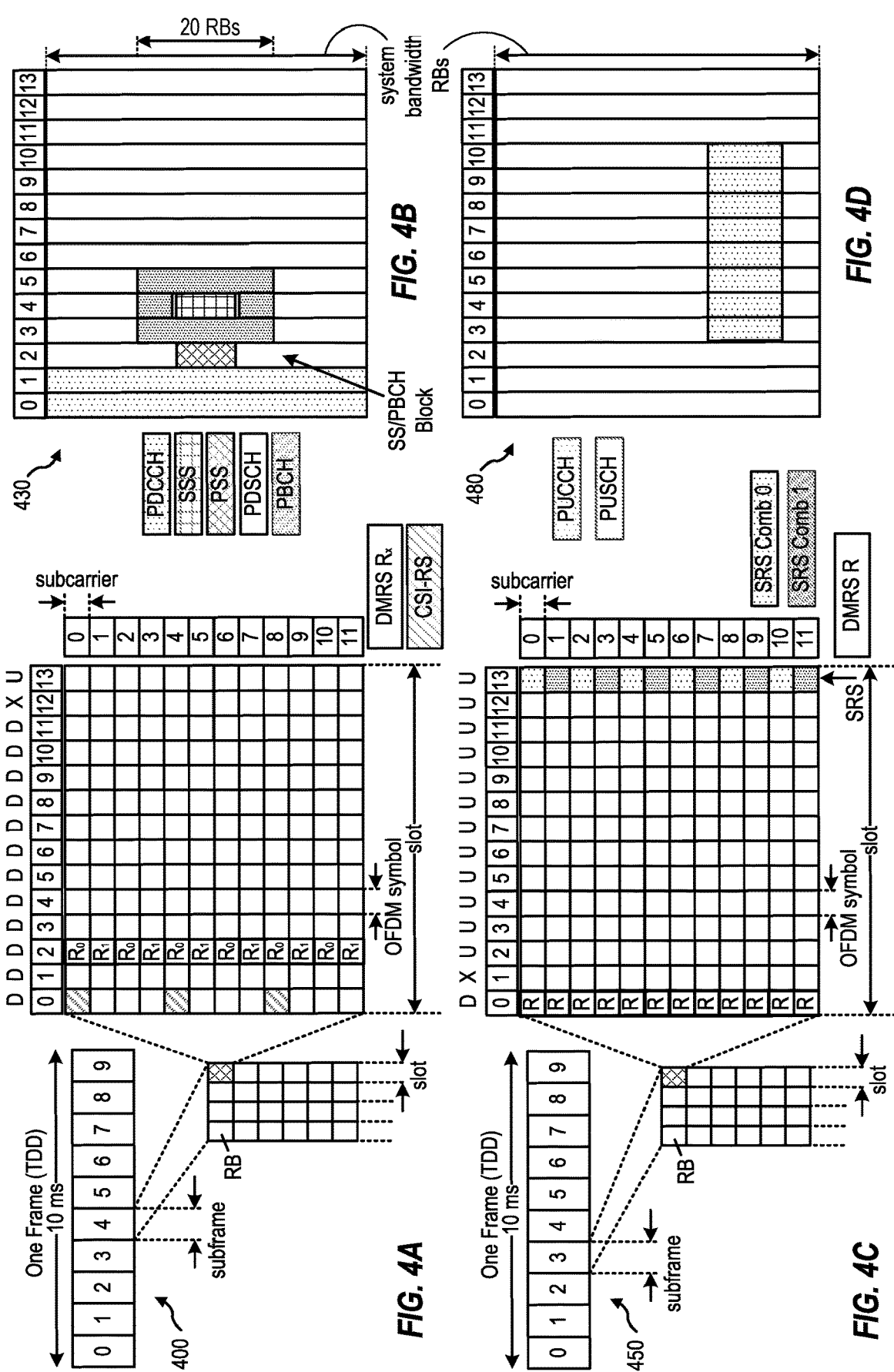
FIGS. 4A, 4B, 4C, and 4D depict various example aspects of data structures for a wireless communications network.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology p=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to OWC Beam Steering with Assistance Information

Aspects of the present disclosure provide apparatuses, methods, processing systems, and computer-readable mediums for assisted beamforming for optical wireless communications (OWC).

OWC may be considered to help achieve the target data rates of advanced systems, such as 6G+. In such cases, different types of beams may be used for different purposes. For example, relatively wide beams may be used to achieve relatively moderate data rates with devices with relatively low mobility, while relatively narrow beams may be used to achieve relatively high data rates with devices with higher mobility.

As noted above, one potential issue in achieving high data rates is the need to perform beam steering to ensure that narrow beams used for high throughput are aimed properly as a device being served moves. Performance of such efforts may be measured in terms of receiver-side error vector magnitude (EVM). EVM generally refers to the difference between received and ideal constellation points and may be calculated by measuring a root means square (rms) of all error vector magnitudes between the received symbol locations and their closest ideal constellation locations.

Aspects of the present disclosure provide techniques that utilizes assistance information to for enhancing beamforming in systems utilizing OWC. As will be described in greater detail below, assistance information may be obtained and used to enhance beam steering based OWC. For example, the assistance information may be rapidly obtained using one or more optical sensors, to efficiently update direction of a beam used in OWC. Assistance information may be conveyed in a same or different spectrum as used for OWC. For example, referring to FIG. 5, OWC may be performed using spectrum from $10^{13}$ to $10^{16}$ Hz, while assistance information may be conveyed in this same spectrum or in other spectrum (e.g., RF spectrum).

Figure 6:
FIG. 6 depicts an example system configured for OWC.
Figure 6:
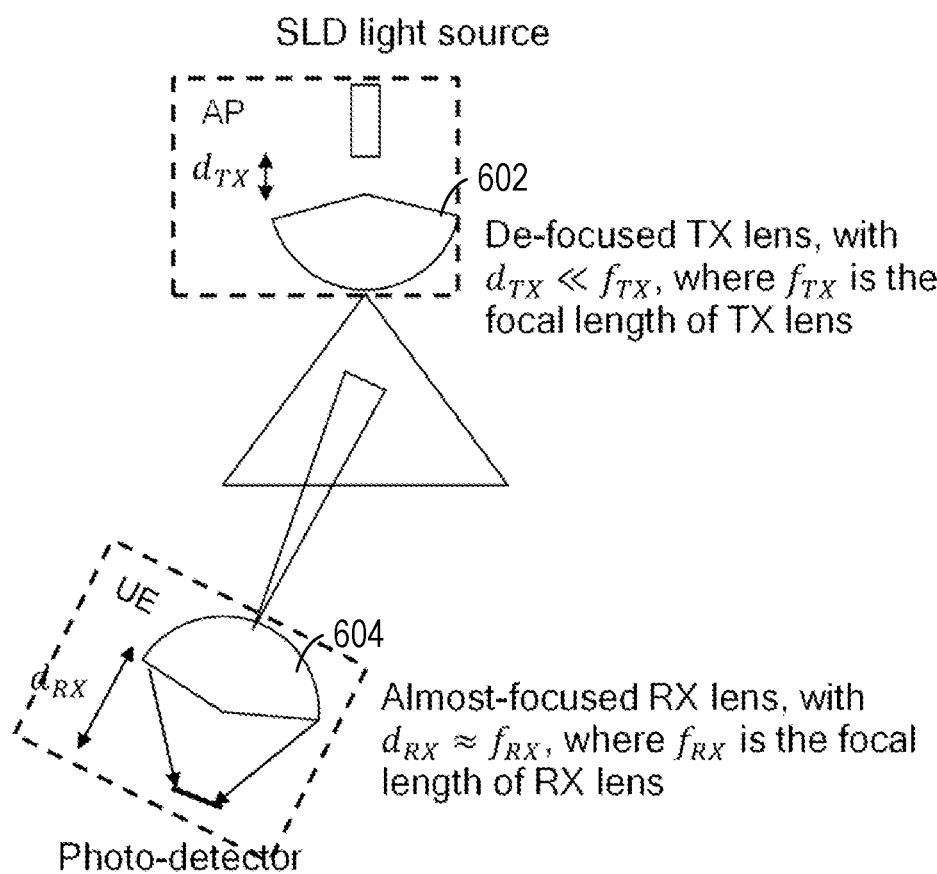

FIG. 6 depicts an example system configured for OWC between wireless nodes (an AP and a UE in the illustrated example). In such a system, UE receive (RX) beam-steering may play an important role in coverage (e.g., reported downlink (DL) coverage of an AP).

As illustrated, at the AP, an optical signal (e.g., generated by a Super-Luminescent Diode (SLD) light source) may be applied to a de-focused transmit (Tx) lens 602 (e.g., with $d_{TX} \ll f_{TX}$, where $d_{TX}$ is the distance from the light source to the lens and $f_{TX}$ is the focal length of the lens).

As illustrated, the result may be links via relatively wide beams which only provides moderate optical gain (e.g., ≤5 dB). This moderate gain on the TX-side may be tolerable because, with RX beam-steering, the UE may use an almost-focused RX lens 604 to achieve significant optical gain (e.g., ≥25 dB). As shown, the almost-focused RX lens 604 generally has a narrow field of view (FOV) angle (e.g., as shown via the narrow beam) and may rely on mechanical beam-steering to establish/maintain a robust downlink with the AP.

In some cases, UE TX beam-steering may play a similarly important role to maintain an uplink in the same cell profile. TX beam-steering may be particularly important as the UE typically has significantly less (e.g., ≥7 dB) TX power than the AP does. Because the AP may simultaneously receive from multiple UEs, it may not be feasible for the AP to perform mechanical beam-steering for uplink reception (UL RX). Consequently, UE TX beam-steering may be used to achieve significant optical gain to maintain an uplink (e.g., >25 dB optical gain).

Mechanical beam steering may be implemented using any suitable mechanisms. For example, an OWC enabled device (e.g., a UE) may be mounted on a movable structure, such as a gimbal driven by DC motors. A motor controller may move the UE in different dimensions (e.g., elevation and azimuth) based on one or more inputs derived from certain measurement techniques, as will be described in greater detail below. For example, the inputs may be based on receive error vector magnitude (EVM) measurements obtained via an optical sensor. Various algorithms may be used to enhance obtaining such inputs. For example, a beam-steering controller may utilize a "searching gradient" that is obtained via sequence analysis using input from one or more optical sensors (e.g., such as video snapshots of an image area captured by a camera or array of phot detectors).

In some cases, certain reference signals or sequences may be transmitted as assistance information to help assist in determining an optimal beam steering direction. In some cases, such assistance information may be used with an algorithm to greatly reduce the time taken to determine beam steering inputs. As will be described in greater detail below, such an algorithm may involve a searching gradient based on analysis of an image sequence analysis.

As will be described in greater detail below, assistance information may be obtained and used to enhance beam steering based OWC. For example, such assistance information may be rapidly obtained using one or more optical sensors, to efficiently update direction of a beam used in OWC. As a result, increased data rates may be achieved and maintained even as a device moves The techniques proposed herein may take advantage of a relatively unique feature of OWC transmissions, which is a direct current (DC) light component from a DC Bias applied. This presence of strong DC light due to a DC bias current may help facilitate direct intensity modulation for OWC. Such a DC-offset OFDM (DCO-OFDM) may be used as a waveform for OWC to provide medium-to-high data rate over access topology (e.g., as in IEEE 802.11 bb and ITU-T G.9991).

Figure 7A:
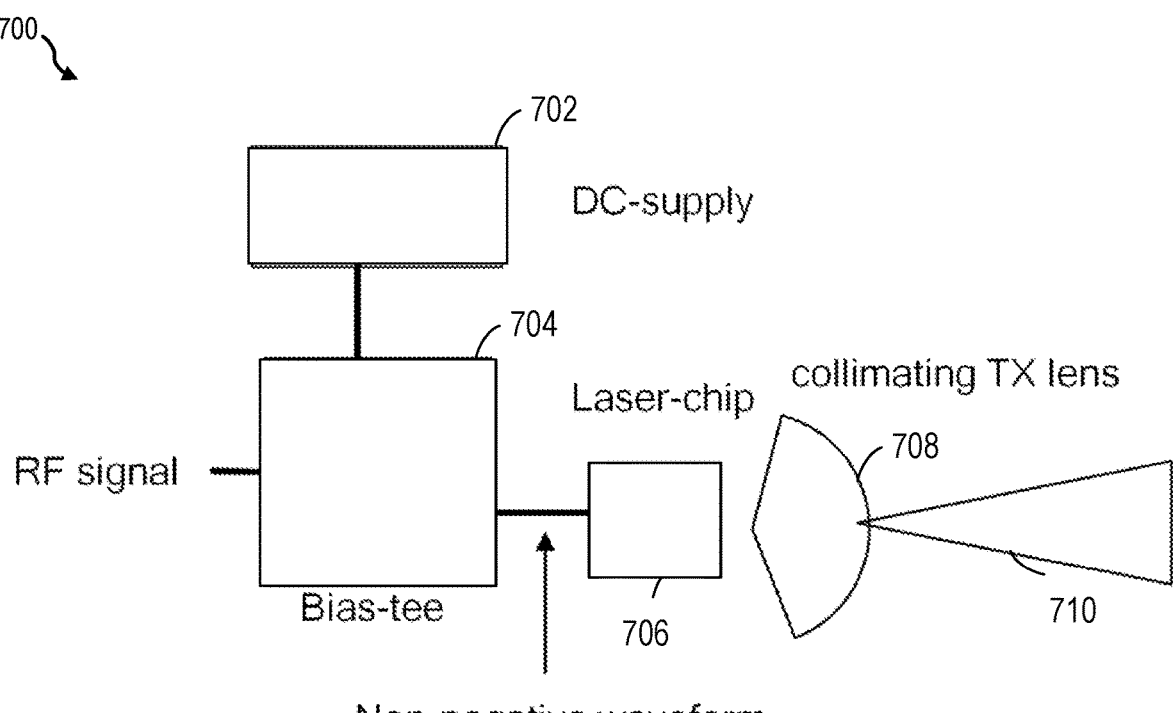
FIGS. 7A and 7B depict example configurations for OWC transmissions.
Figure 7B:
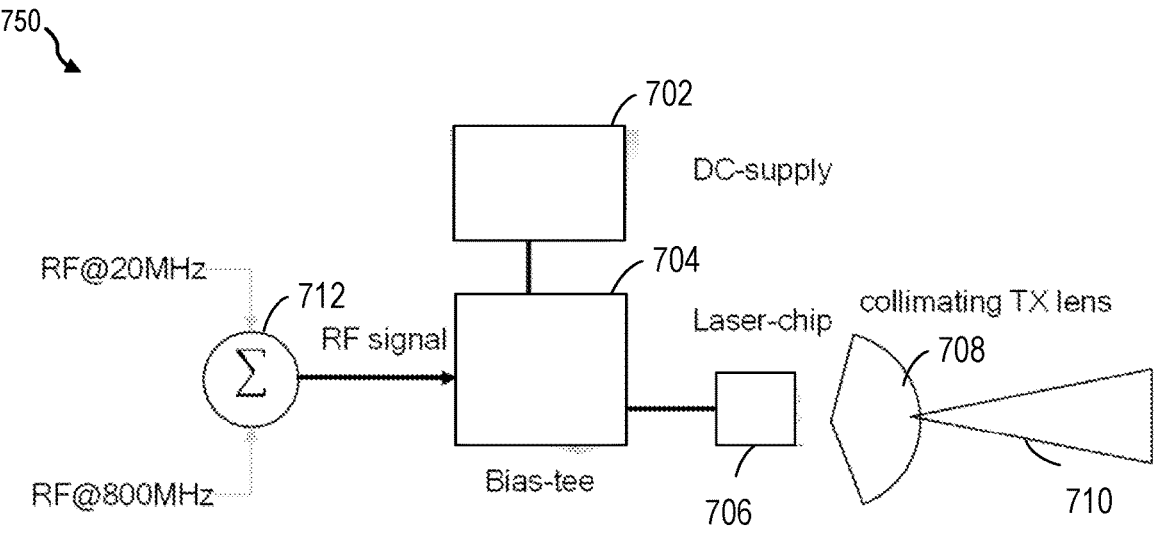
Figure 9A:
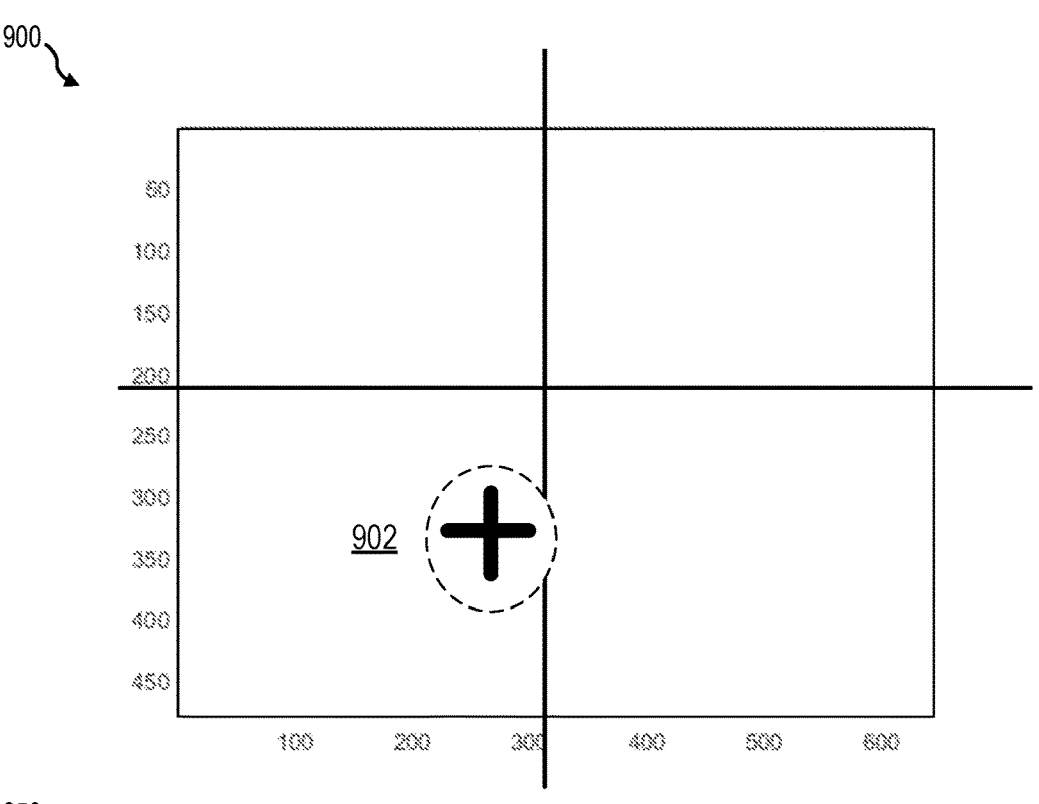
FIGS. 9A and 9B depict an example of image processing for assisted beamforming for OWC communication, in accordance with aspects of the present disclosure.
Figure 9B:
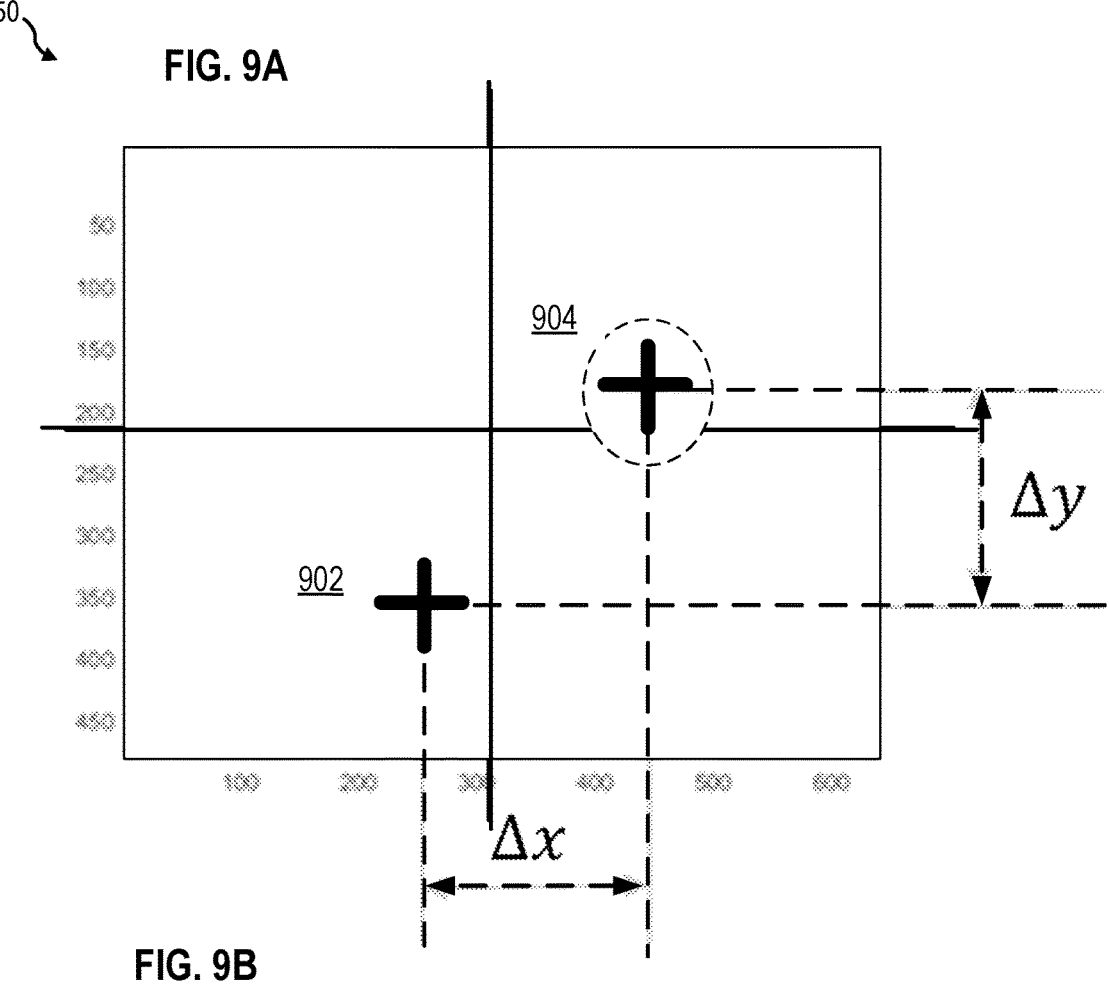

FIGS. 7A and 7B depict example configurations for OWC transmissions. As illustrated in configuration 700 FIG. 7A, a DC supply 702 may output up to 1.5 A to drive laser operation (via a laser chip 706), of which the luminous flux may be up to 3601 m (e.g., like a 40 W incandescent lamp under 230V). The output light power may be further condensed/collimated by a TX lens 708. In this context, collimating generally refers to the process of aligning light in a parallel fashion, in an effort to ensure that the light has minimal spread as it propagates and enters the relevant measurement area (e.g., an Rx lens at the UE). As a result, an optical sensor (e.g., a camera) may readily see an easy-to-segment "spot" as shown in FIGS. 9A and 9B, which may allow processing without the use of complicated computer-vision algorithms.

Another unique feature of OWC is that regardless which RF frequencies are transmitted, it is the optical beam which finally determines the RF signal foot-print. Therefore, as illustrated in configuration 750 of FIG. 7B, different RF frequencies may be multiplexed over the same laser beam (e.g., 20 MHz and 800 MHz in the illustrated example).

In the example illustrated in FIG. 7B, an OWC receiver may measure over the 20 MHz RF frequency to know what channel/beam looks like over the 800 MHz RF frequency. This feature may be exploited to introduce a low-RF "beacon" channel that effectively conveys assistance information, to assist beam-steering for OWC data exchange over a high-RF frequency. Such a beacon may carry more information beyond those over DC light (e.g., better identification). Such a beacon may be detected, for example, using just a partial-receiver (e.g., instead of a full transceiver as in sub-6 GHz assisted mmW/THz beam management).

Figure 8:
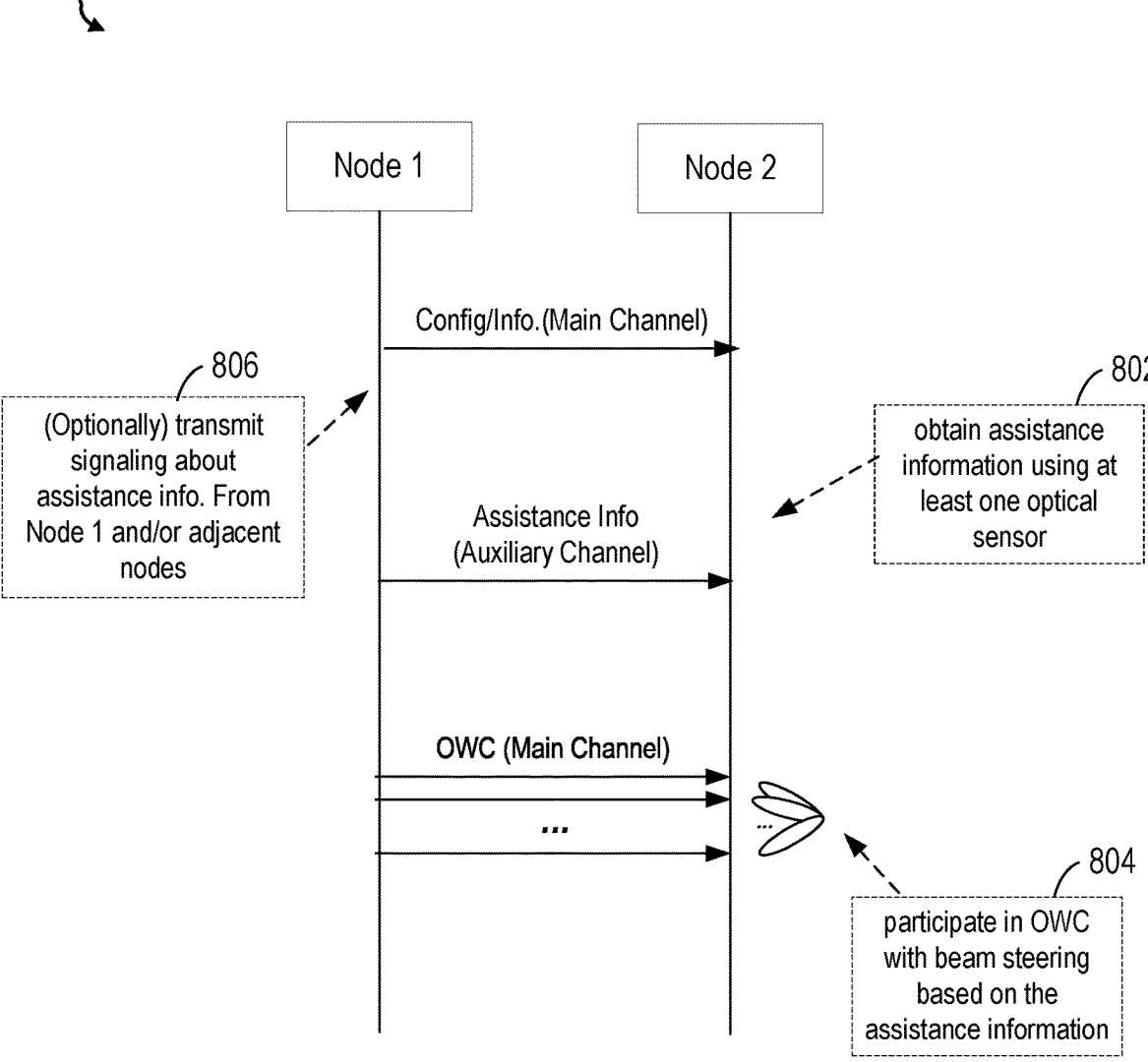
FIG. 8 depicts an example call flow diagram for OWC communication, in accordance with aspects of the present disclosure.

FIG. 8 depicts an example call flow diagram 800 for OWC communication between two wireless nodes (Node 1 and Node 2), in accordance with aspects of the present disclosure. In some aspects, one of the nodes shown in FIG. 8 (e.g., Node 2) may be an example of the UE 104 depicted and described with respect to FIGS. 1 and 3. The other node (e.g., Node 1) may be a network entity, such as an example of the BS 102 (e.g., a gNB) depicted and described with respect to FIGS. 1 and 3, an access point (AP), or a disaggregated base station depicted and described with respect to FIG. 2.

As illustrated at 802, Node 2 may obtain assistance information (transmitted from Node 1) using at least one optical sensor. As will be described below, the assistance information may be obtained by processing an image obtained using the at least one optical sensor. The processing may be based on error vector magnitude (EVM) measurements, for example, involving calculation of a searching gradient based on a distance, within the image, from a current EVM measurement to a reference EVM measurement.

As illustrated at 804, Node 2 may the participate in optical wireless communication (OWC) with a second node with beam steering based on the assistance information. In some cases, the assistance information may be obtained on a first channel and the OWC may be performed on a second channel. In some cases, the assistance information may be obtained at an optical wavelength different than a main OWC channel. In other cases, the assistance information may be obtained via a channel that is outside of OWC spectrum, such as an RF channel outside of a main OFC channel.

In some cases, Node 1 and Node 2 may exchange control information regarding the assistance information. For example, as illustrated at 806, in some cases, Node 1 may transmit control information to Node 2 regarding assistance information Node 1 is transmitting (or is to transmit). In some cases, Node 2 may indicate capability information that indicated Node 2 is capable of detecting and/or processing the assistance information.

FIGS. 9A and 9B depict an example of image processing for assisted beamforming for OWC communication, in accordance with aspects of the present disclosure.

A technique for assisting beamforming may be considered an optical sensor (e.g., camera) based searching gradient. In general, a segmented grey-level "sub-image" of the TX light source (KSLD+TX lens) may be captured and EVM measurement may be performed. The relatively strong DC bias may help ensure that a relatively large threshold (e.g., 240 if 8 bits) can be used to perform segmentation and detection of a current centroid 902.

The gradient search may be performed as follows. As illustrated in FIG. 9B, a "zero" centroid 904 may be recorded when a satisfactory EVM is measured. A relatively fast (coarse) search may be performed based upon the differences (i.e., $\Delta x$ and $\Delta y$) from the current centroid 902 to the recorded zero centroid 904. In some cases, these values may be translated into movement of a lens. For example, the values may be used as an action to perform mechanical beam steering, for example, to move a lens up, down, to the left and/or to the right.

Such an algorithm may be iteratively run, for example, in a spiral pattern from a starting point using fixed elevation and azimuth steps of a certain step size. In each step of the spiral search, an EVM sample may be recorded. In some cases, if the EVM reaches a threshold (e.g., an "early-stop threshold"), the search may freeze at the current beam steered setting. Otherwise, the search may return to looking for a best steering, for example, until reaching a defined number of steps without reaching an early step.

Such spiral searches may have EVM-dependent configurations. For example, a larger EVM may lead to a larger step-size for an azimuth action and/or an elevation action. The early-step threshold may be defined to stop at the steering achieving x-percent (say x=10) drop compared to current EVM. Iteratively running such advanced spiral searches, a beam steering UE may observe excellent convergence in arriving at a "steering" that leads to an optimal (e.g., minimum) RX EVM, which may be better than an EVM achieved using manual optical alignment. Beam-steering speed may be improved when using such an optical sensor based (camera-based) gradient.

Figure 10:
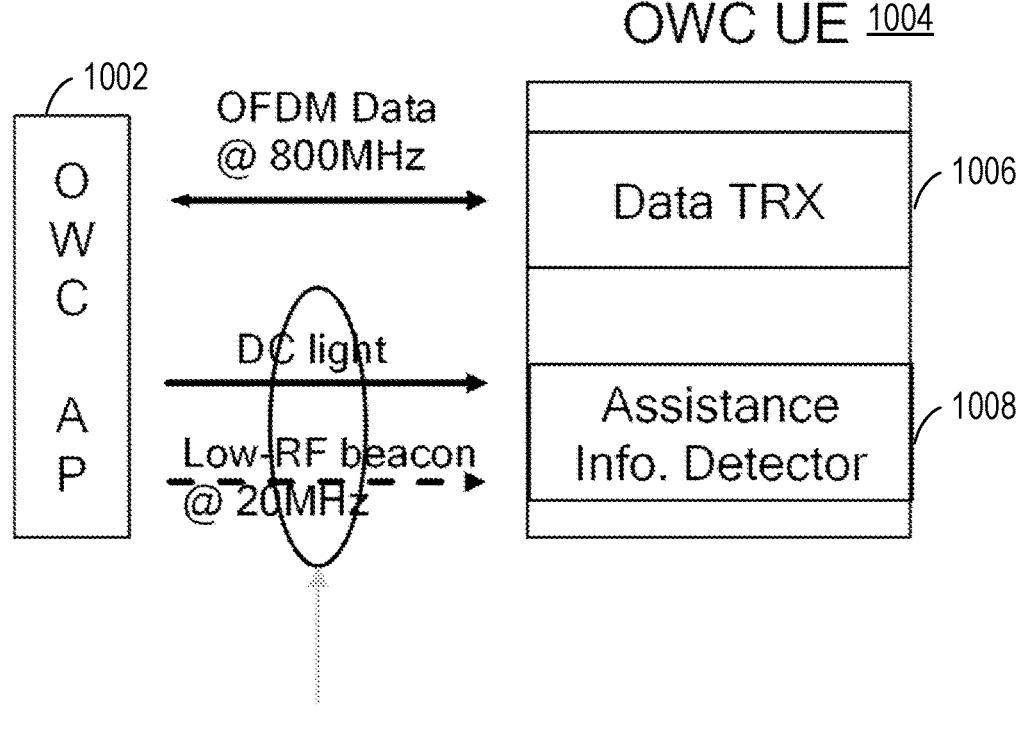
FIGS. 10 and 11 depict examples of assisted beamforming for OWC communication, in accordance with aspects of the present disclosure.
Figure 11:
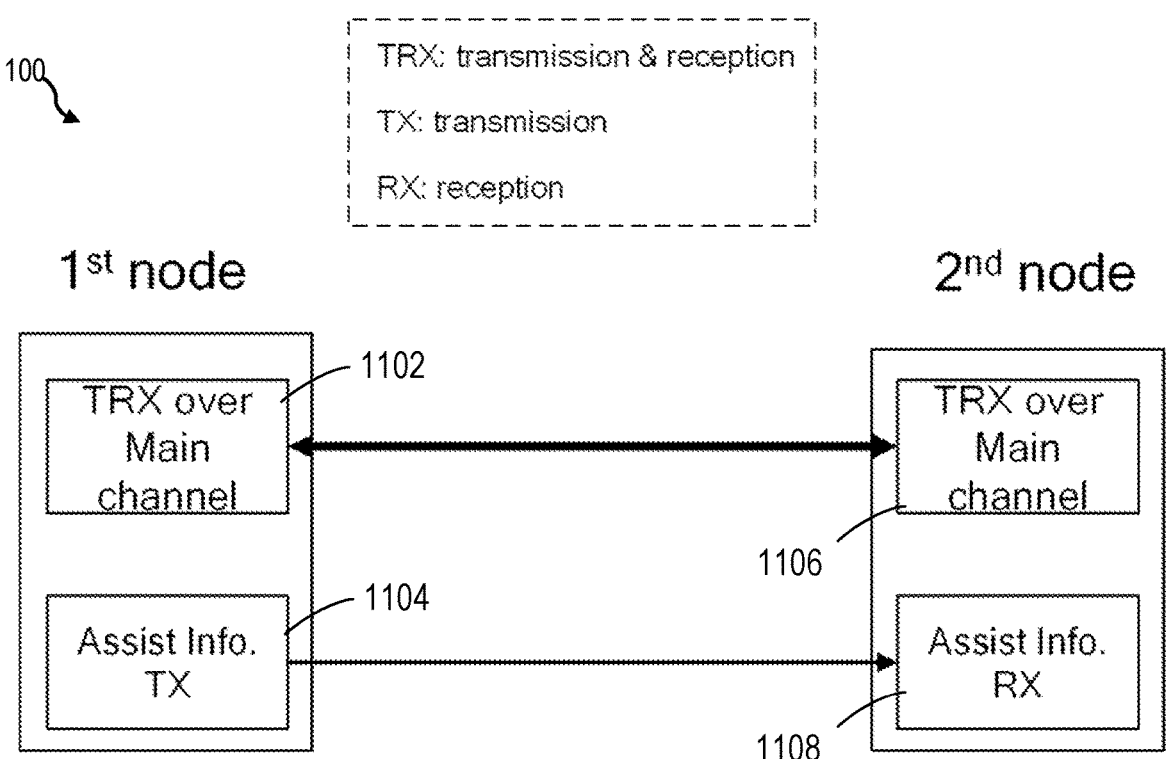

FIGS. 10 and 11 depict examples of assisted beamforming for OWC communication, in accordance with aspects of the present disclosure.

As described above, the presence of relatively strong DC light in OWC signals (e.g., a DCO-OFDM waveform), generated via direct intensity modulation may be leveraged to significantly simplify processing (e.g., via video sequence analysis). As described above with respect to the call flow diagram 800 of FIG. 8, when communicating over an OWC channel (e.g., a main OWC channel), two wireless nodes may utilize assistance information to assist beam-steering used to enhance communication over the main channel.

As illustrated in the example 1000 of FIG. 10, a 1st node 1002 (e.g., an AP) may transmit pre-specified assist information (e.g., as a signal or a channel). A 2nd node 1004 (e.g., an OWC UE) may include a separate sensing/detecting sub-system 1008 (separate from a sub-system 1006 for data transmission and reception) to detect/process the assistance information to help beam-steering over main channel.

As illustrated, the direct intensity modulation may facilitate multiplexing of a low-RF "beacon" signal/channel in addition to DC light, to assist beam-steering over a high-RF data channel. In the illustrated example, an OWC AP transmits a narrow-band beacon at 20 MHz RF, which can be detected by the OWC UE via a separate beacon detector(s), from which the searching gradient (described above) may be obtained, for beam-steering over a main 800 MHz data channel.

The assistance information detector 1008 may include narrow-band photo-detector(s) can be low-cost, which may have guaranteed signal to noise ratio (SNR) via a relatively large sensitivity size or/and time-domain accumulation. As noted above, in some cases, the AP and UE may exchange control signaling (e.g., over the data channel) regarding the related assistance information.

The example 1100 of FIG. 11 generally shows how a 1st node 1102 (e.g., an AP) may transmit pre-specified assist information (e.g., as a signal or a channel) to a $2^{nd}$ node 1104 (e.g., a UE). As illustrated at 1102 and 1106 the $1^{st}$ and $2^{nd}$ nodes may communicate over an OWC channel. As illustrated at 1104 and 1108, the $2^{nd}$ node may utilize assistance information to assist in beam-steering over the main channel. For example, the $1^{st}$ node may transmit pre-specified assist information (as a signal or a channel), which is detected/processed by the $2^{nd}$ via a separate sensing/detecting sub-system.

The assistance information can be carried as DC light over a specified range of wavelengths. In addition, or as an alternative, the assistance information may be carried as a narrow-band RF "beacon" signal over a lower (compared to the main channel) electrical frequency. As noted above, the 2nd node may detect the above assist information with a camera or a low-cost narrow-band photo-detector(s).

As noted above, in some cases the $1^{st}$ node may transmit signaling, over the main channel, about the assistance information that it is transmitting (or will be transmitting). In some cases, this information may include assist information for adjacent nodes.

In some cases, the $2^{nd}$ node may transmit signaling (e.g., over the main channel) regarding its capability in detecting/processing assistance information. In some, the signaled information may include results of detecting/processing assistance information from the $1^{st}$ node (and/or other adjacent nodes). In some cases, transmission of assistance information from the $1^{st}$ node may be triggered by a request from the $2^{nd}$ node (e.g., a request transmitted over the main channel).

Figure 12:
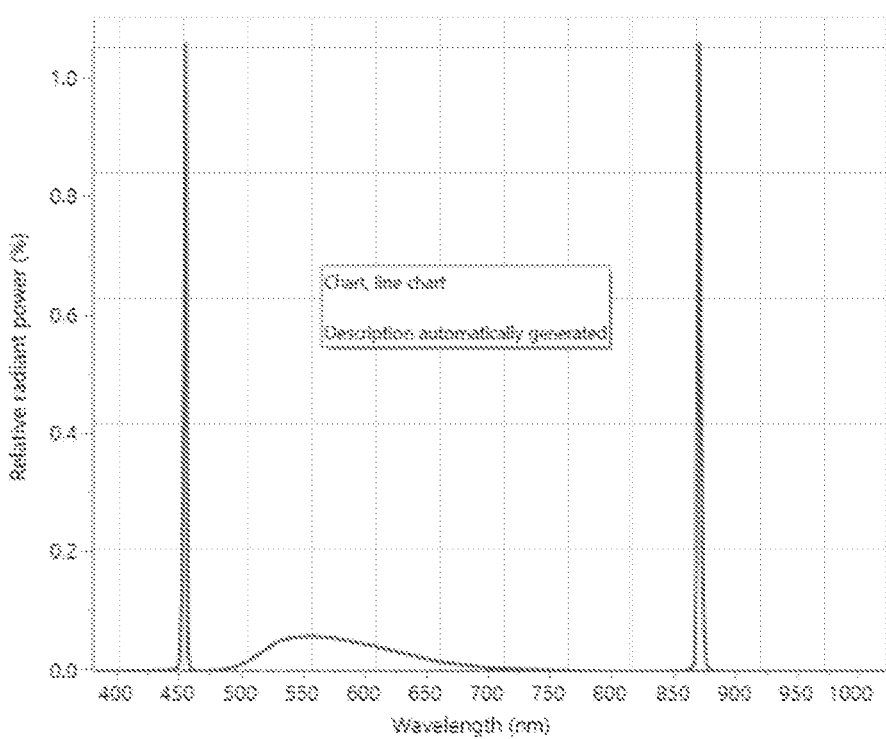
FIG. 12 depicts example wavelengths that may be used for conveying assistance information for OWC communication, in accordance with aspects of the present disclosure.

As noted above, the assistance information may be transmitted at an optical wavelength that is different from that of the main channel. As an example, assistance information and data may be transmitted on different wavelengths, using a dual-wavelength light source. In an example illustrated in FIG. 12, a main OWC channel may be over an 450 nm wavelength 1202, while assistance information may be conveyed over an 850 nm wavelength 1204. Transmitting the assistance information over a wavelength that is different from that carrying the main channel may be beneficial. For example, using separate wavelengths may ease image segmentation, for example, allowing a large threshold when an impulse response (IR) filter is applied. This may help facilitate detecting assistance information via a relatively low cost optical sensor (such as a normal camera).

Figure 13A:
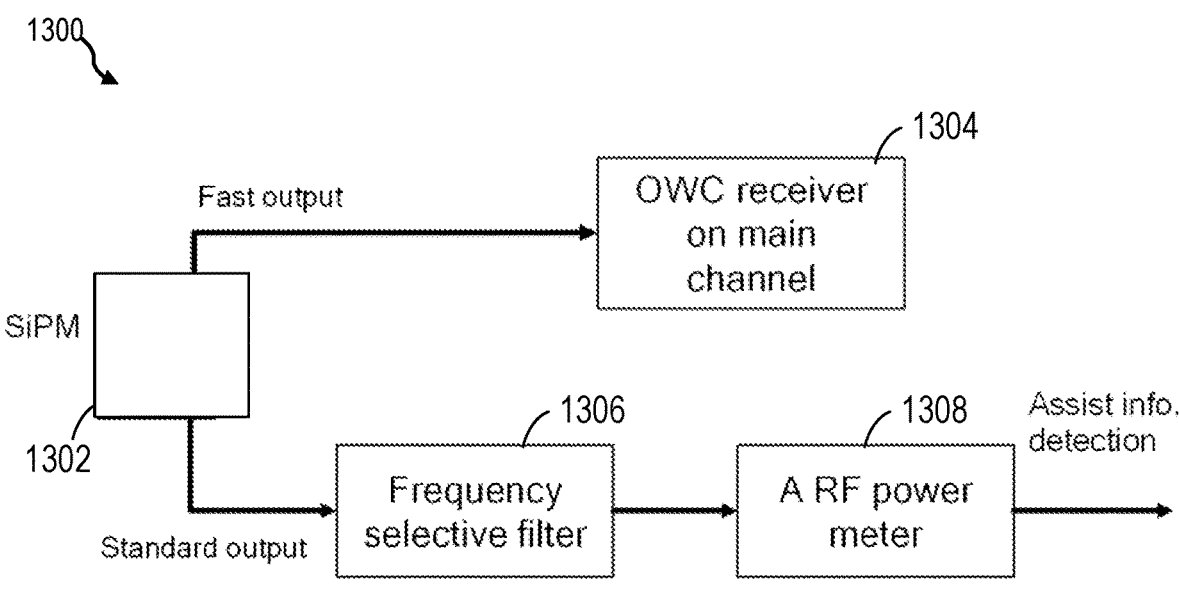
FIGS. 13A and 13B depict an example of assisted beamforming for OWC communication, in accordance with aspects of the present disclosure.

As illustrated in the example 1300 of FIG. 13A, in some cases, a same optical sensor, such as a silicon photo-multiplier (SiPM) 1302 may be used that supports simultaneous outputs. The simultaneous outputs may include a standard output and a fast output, which can be leveraged as respective inputs to the main channel and the assistance information detection.

Figure 13B:
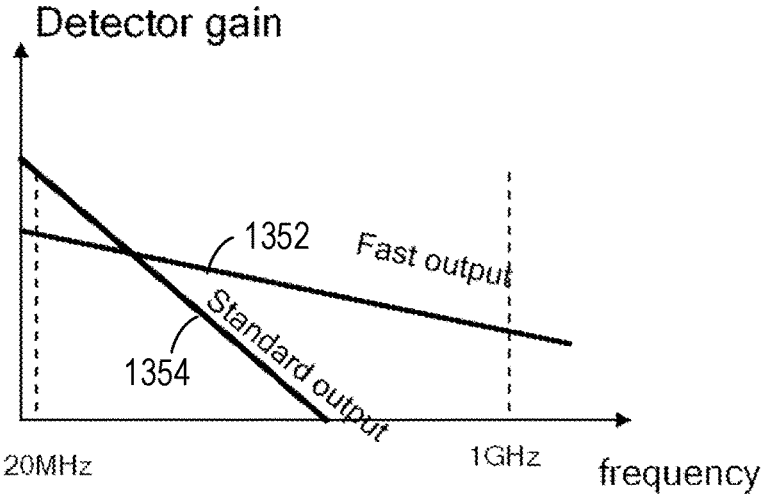

In some cases, as shown at 1352 in graph 1350 of FIG. 13, the standard/fast output may have a higher gain (than standard output 1354) in detecting RF at lower/higher frequency. For this reason, it may make sense to use the fast output for OWC main channel reception while to use the standard output for assistance information detection.

The fast output may be detected by a first receiver 1304, while the standard output may be filtered, at 1306, before detection via a meter 1308. The filter 1306 may be a low-pass/band-pass filter used for detecting DC light/assistance information transmitted at relatively low RF frequency.

Figure 14A:
FIGS. 14A and 14B depict an example of image processing for assisted beamforming for OWC communication, in accordance with aspects of the present disclosure.
Figure 14A:
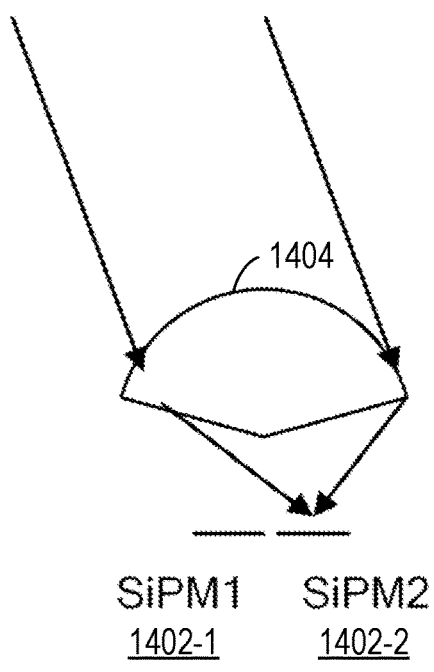

As illustrated in example 1400 of FIG. 14A, in some cases, an SiPM array (e.g., formed of SiPMs 1402-1, 1402-2, . . . 1402-N) may be put behind a single condensing lens 1404. In this case, assistance information detection outputs from each of the respective SiPMs can be jointly used to generate searching gradient. As shown in FIG. 14A, a bundle of oblique rays may result in larger optical power collected by one SiPM (e.g., SiPM2) than by another SiPM (e.g., SiPM1).

Figure 14B:
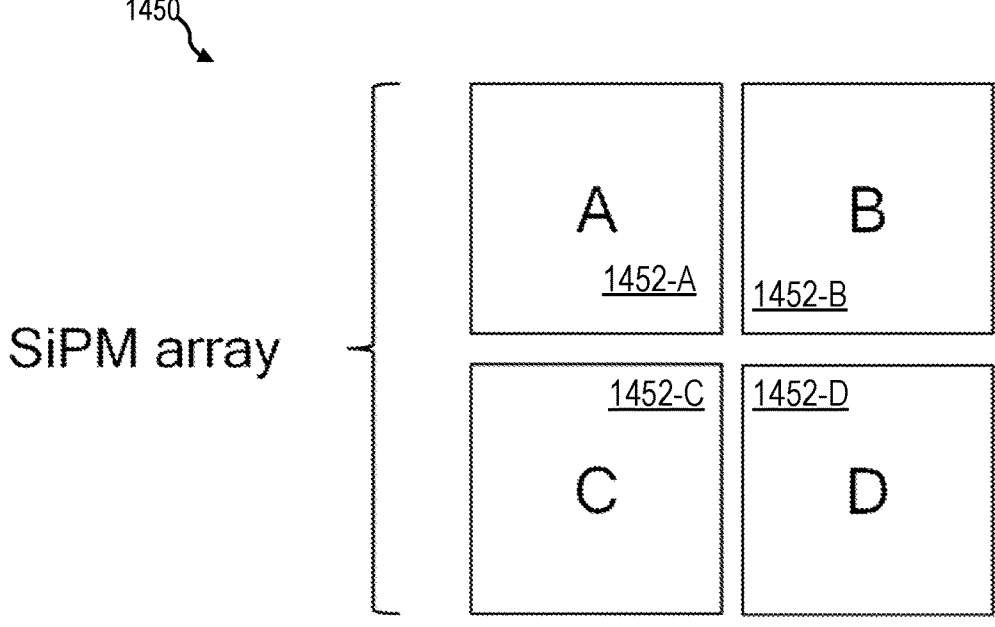

Hence, as shown in FIG. 14B, an SiPM array may be partitioned and the gradient may be calculated from the sum of assistance information detected in different partitions. For example, in the illustrated example, an SiPM array is partitioned into four parts, denoted as A (1452-A), B (1452-B), C (1452-C), and D (1452-D). The gradient values $\Delta x$ and $\Delta_y$ may be calculated as:

$$\Delta x = (P_A + P_C) - (P_B + P_D)$$

and $$\Delta_y = (P_A + P_B) - (P_C + P_D),$$

where $P_x$ is the sum of assistance information detection output from all SiPMs in the $x \in \{A,B,C,D\}$ block.

Figure 15:
FIG. 15 depicts an example of assisted beamforming for OWC communication, in accordance with aspects of the present disclosure.
Figure 15:
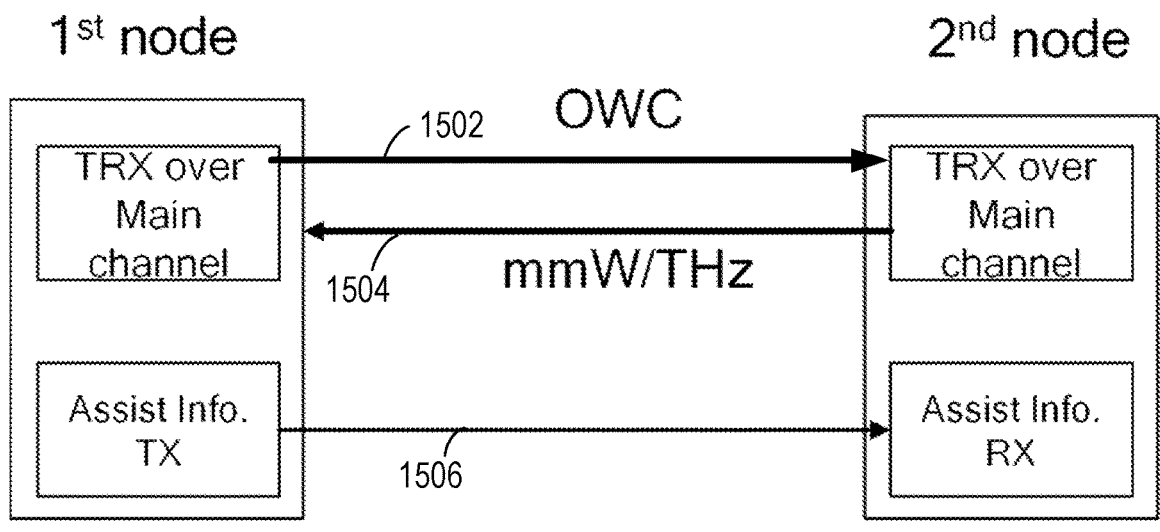

As illustrated in FIG. 15, the techniques proposed herein may be used to establish hybrid links, including a main OWC channel 1502 and another channel 1504 (e.g., mmW/THz). In the illustrated example, the first node may transmit over the OWC channel 1502 to the $2^{nd}$ node, while the $2^{hd}$ node transmits over the mmW/THz channel 1504 to the $1^{st}$ node. In addition, assistance information may still be conveyed over channel 1506, to assist in RX beam-steering at the $2^{nd}$ UE over the OWC main-channel 1502. With reasonable beam configuration for the mmW/THz channel 1504 (e.g., with beam correspondence), the optimized RX steering for the OWC channel 1502 may be useful for TX beam-forming over the mmW/THz channel 1504.

Example Operations

Figure 16:
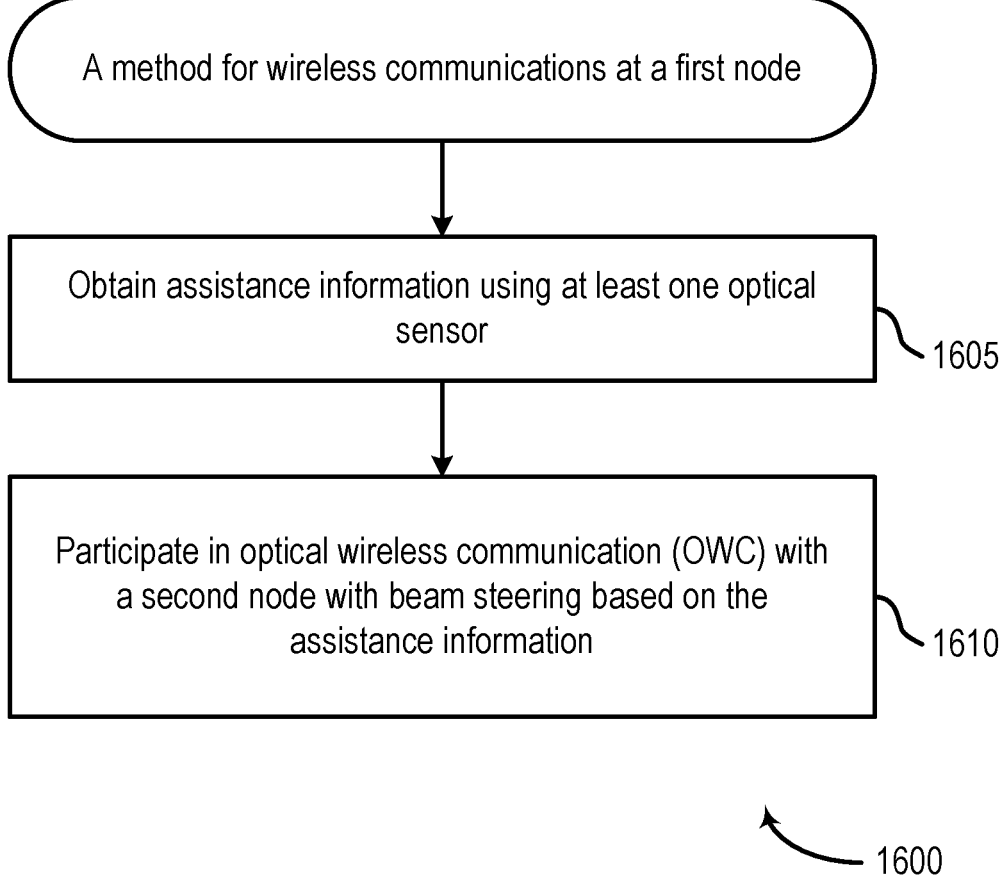
FIG. 16 depicts a method for wireless communications.

FIG. 16 shows an example of a method 1600 of wireless communications at a first node. In some examples, the first node is a user equipment, such as a UE 104 of FIGS. 1 and 3. In some examples, the first node is a network entity, such as a BS 102 of FIGS. 1 and 3, or a disaggregated base station as discussed with respect to FIG. 2.

Method 1600 begins at step 1605 with obtaining assistance information using at least one optical sensor. In some cases, the operations of this step refer to, or may be performed by, circuitry for obtaining and/or code for obtaining as described with reference to FIG. 18.

Method 1600 then proceeds to step 1610 with participating in optical wireless communication (OWC) with a second node with beam steering based on the assistance information. In some cases, the operations of this step refer to, or may be performed by, circuitry for participating and/or code for participating as described with reference to FIG. 18.

In some aspects, the assistance information is obtained by processing an image obtained using the at least one optical sensor.

In some aspects, the processing is based on error vector magnitude (EVM) measurements.

In some aspects, the processing involves calculation of a searching gradient based on a distance, within the image, from a current EVM measurement to a reference EVM measurement.

In some aspects, the at least one optical sensor comprises an array of photo multipliers; the array is partitioned into different parts; and the searching gradient is calculated based on output from the different parts of the array.

In some aspects, the assistance information is obtained on a first channel; and the OWC is performed on a second channel.

In some aspects, the method 1600 further includes exchanging, with the second node over the second channel, control information regarding the assistance information. In some cases, the operations of this step refer to, or may be performed by, circuitry for exchanging and/or code for exchanging as described with reference to FIG. 18.

In some aspects, exchanging the control information comprises receiving control information from the second node that indicates at least one of: information regarding assistance information the second node is transmitting or is to transmit; or information regarding assistance information at least a third node is transmitting or is to transmit.

In some aspects, exchanging the control information comprises transmitting control information to the second node that indicates at least one of: information regarding capability of the first node to detect or process the assistance information; results of the first node processing the assistance information from the second node or assistance information from at least a third node; or a request for the second node to transmit assistance information.

In some aspects, the assistance information is obtained at an optical wavelength different from that of the main channel.

In some aspects, a same photo multiplier is used to obtain the assistance information on the first channel and receive data on the second channel.

In some aspects, participating in the OWC comprises: receiving information from the second node via an OWC channel; and transmitting information to the second node via an RF channel outside of the OFC channel.

Figure 18:
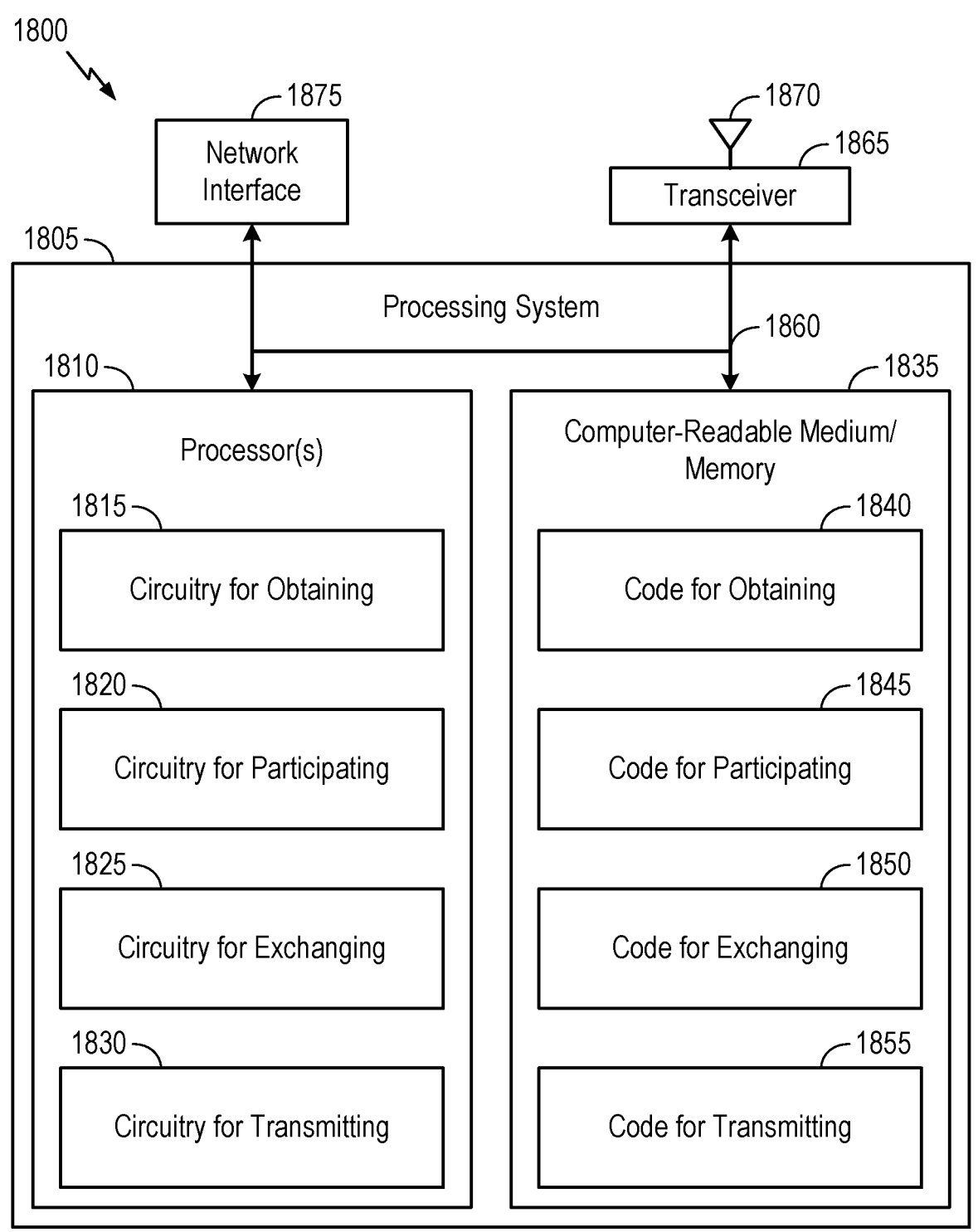
FIG. 18 depicts aspects of an example communications device.

In one aspect, method 1600, or any aspect related to it, may be performed by an apparatus, such as communications device 1800 of FIG. 18, which includes various components operable, configured, or adapted to perform the method 1600. Communications device 1800 is described below in further detail.

Note that FIG. 16 is just one example of a method, and other methods including fewer, additional, or alternative steps are possible consistent with this disclosure.

Figure 17:
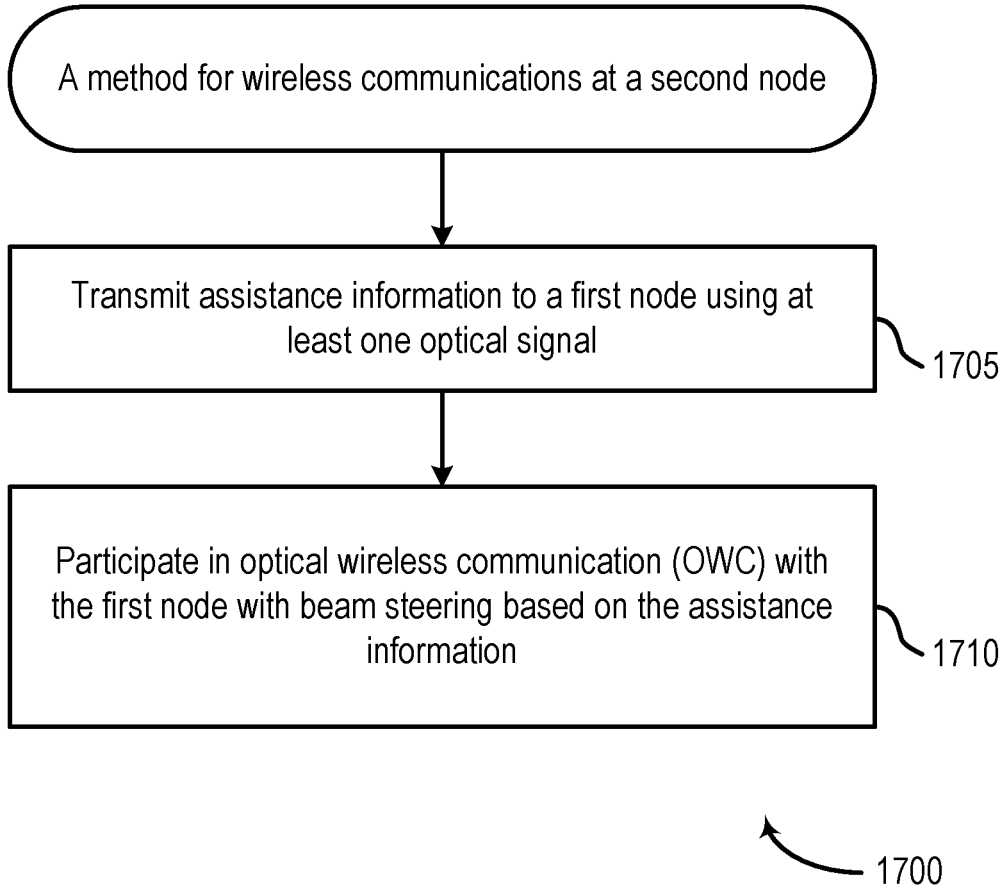
FIG. 17 depicts a method for wireless communications.

FIG. 17 shows an example of a method 1700 of wireless communications at a second node. In some examples, the second node is a user equipment, such as a UE 104 of FIGS. 1 and 3. In some examples, the second node is a network entity, such as a BS 102 of FIGS. 1 and 3, or a disaggregated base station as discussed with respect to FIG. 2.

Method 1700 begins at step 1705 with transmitting assistance information to a first node using at least one optical signal. In some cases, the operations of this step refer to, or may be performed by, circuitry for transmitting and/or code for transmitting as described with reference to FIG. 18.

Method 1700 then proceeds to step 1710 with participating in optical wireless communication (OWC) with the first node with beam steering based on the assistance information. In some cases, the operations of this step refer to, or may be performed by, circuitry for participating and/or code for participating as described with reference to FIG. 18.

In some aspects, the assistance information is transmitted on a first channel; and the OWC is performed on a second channel.

In some aspects, the method 1700 further includes exchanging, with the first node over the second channel, control information regarding the assistance information. In some cases, the operations of this step refer to, or may be performed by, circuitry for exchanging and/or code for exchanging as described with reference to FIG. 18.

In some aspects, exchanging the control information comprises transmitting control information to the first node that indicates at least one of: information regarding assistance information the second node is transmitting or is to transmit; or information regarding assistance information at least a third node is transmitting or is to transmit.

In some aspects, exchanging the control information comprises receiving control information from the first node that indicates at least one of: information regarding capability of the first node to detect or process the assistance information; results of the first node processing the assistance information from the second node or assistance information from at least a third node; or a request for the second node to transmit assistance information.

In some aspects, the assistance information is transmitted at an optical wavelength different from that of the main channel.

In some aspects, participating in the OWC comprises: transmitting information to the first node via an OWC channel; and receiving information from the first node via an RF channel outside of the OFC channel.

In one aspect, method 1700, or any aspect related to it, may be performed by an apparatus, such as communications device 1800 of FIG. 18, which includes various components operable, configured, or adapted to perform the method 1700. Communications device 1800 is described below in further detail.

Note that FIG. 17 is just one example of a method, and other methods including fewer, additional, or alternative steps are possible consistent with this disclosure.

Example Communications Device(s)

FIG. 18 depicts aspects of an example communications device 1800. In some aspects, communications device 1800 is a user equipment, such as UE 104 described above with respect to FIGS. 1 and 3. In some aspects, communications device 1800 is a network entity, such as BS 102 of FIGS. 1 and 3, or a disaggregated base station as discussed with respect to FIG. 2.

The communications device 1800 includes a processing system 1805 coupled to the transceiver 1865 (e.g., a transmitter and/or a receiver). In some aspects (e.g., when communications device 1800 is a network entity), processing system 1805 may be coupled to a network interface 1875 that is configured to obtain and send signals for the communications device 1800 via communication link(s), such as a backhaul link, midhaul link, and/or fronthaul link as described herein, such as with respect to FIG. 2. The transceiver 1865 is configured to transmit and receive signals for the communications device 1800 via the antenna 1870, such as the various signals as described herein. The processing system 1805 may be configured to perform processing functions for the communications device 1800, including processing signals received and/or to be transmitted by the communications device 1800.

The processing system 1805 includes one or more processors 1810. In various aspects, the one or more processors 1810 may be representative of one or more of receive processor 358, transmit processor 364, TX MIMO processor 366, and/or controller/processor 380, as described with respect to FIG. 3. In various aspects, one or more processors 1810 may be representative of one or more of receive processor 338, transmit processor 320, TX MIMO processor 330, and/or controller/processor 340, as described with respect to FIG. 3. The one or more processors 1810 are coupled to a computer-readable medium/memory 1835 via a bus 1860. In certain aspects, the computer-readable medium/memory 1835 is configured to store instructions (e.g., computer-executable code) that when executed by the one or more processors 1810, cause the one or more processors 1810 to perform the method 1600 described with respect to FIG. 16, or any aspect related to it; and the method 1700 described with respect to FIG. 17, or any aspect related to it. Note that reference to a processor performing a function of communications device 1800 may include one or more processors 1810 performing that function of communications device 1800.

In the depicted example, computer-readable medium/memory 1835 stores code (e.g., executable instructions), such as code for obtaining 1840, code for participating 1845, code for exchanging 1850, and code for transmitting 1855. Processing of the code for obtaining 1840, code for participating 1845, code for exchanging 1850, and code for transmitting 1855 may cause the communications device 1800 to perform the method 1600 described with respect to FIG. 16, or any aspect related to it; and the method 1700 described with respect to FIG. 17, or any aspect related to it.

The one or more processors 1810 include circuitry configured to implement (e.g., execute) the code stored in the computer-readable medium/memory 1835, including circuitry for obtaining 1815, circuitry for participating 1820, circuitry for exchanging 1825, and circuitry for transmitting 1830. Processing with circuitry for obtaining 1815, circuitry for participating 1820, circuitry for exchanging 1825, and circuitry for transmitting 1830 may cause the communications device 1800 to perform the method 1600 described with respect to FIG. 16, or any aspect related to it; and the method 1700 described with respect to FIG. 17, or any aspect related to it.

Various components of the communications device 1800 may provide means for performing the method 1600 described with respect to FIG. 16, or any aspect related to it; and the method 1700 described with respect to FIG. 17, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1865 and the antenna 1870 of the communications device 1800 in FIG. 18. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1865 and the antenna 1870 of the communications device 1800 in FIG. 18.

Example Clauses

Implementation examples are described in the following numbered clauses:

Clause 1: A method for wireless communications at a first node, comprising: obtaining assistance information using at least one optical sensor; and participating in optical wireless communication (OWC) with a second node with beam steering based on the assistance information.

Clause 2: The method of Clause 1, wherein the assistance information is obtained by processing an image obtained using the at least one optical sensor.

Clause 3: The method of Clause 2, wherein the processing is based on error vector magnitude (EVM) measurements.

Clause 4: The method of Clause 3, wherein the processing involves calculation of a searching gradient based on a distance, within the image, from a current EVM measurement to a reference EVM measurement.

Clause 5: The method of Clause 4, wherein: the at least one optical sensor comprises an array of photo multipliers; the array is partitioned into different parts; and the searching gradient is calculated based on output from the different parts of the array.

Clause 6: The method of any one of Clauses 1-5, wherein the assistance information is obtained on a first channel; and the OWC is performed on a second channel.

Clause 7: The method of Clause 6, further comprising exchanging, with the second node over the second channel, control information regarding the assistance information.

Clause 8: The method of Clause 7, wherein exchanging the control information comprises receiving control information from the second node that indicates at least one of: information regarding assistance information the second node is transmitting or is to transmit; or information regarding assistance information at least a third node is transmitting or is to transmit.

Clause 9: The method of Clause 7, wherein exchanging the control information comprises transmitting control information to the second node that indicates at least one of: information regarding capability of the first node to detect or process the assistance information; results of the first node processing the assistance information from the second node or assistance information from at least a third node; or a request for the second node to transmit assistance information.

Clause 10: The method of Clause 6, wherein the assistance information is obtained at an optical wavelength different from that of the main channel.

Clause 11: The method of Clause 6, wherein a same photo multiplier is used to obtain the assistance information on the first channel and receive data on the second channel.

Clause 12: The method of any one of Clauses 1-11, wherein participating in the OWC comprises: receiving information from the second node via an OWC channel; and transmitting information to the second node via an RF channel outside of the OFC channel.

Clause 13: A method for wireless communications at a second node, comprising: transmitting assistance information to a first node using at least one optical signal; and participating in optical wireless communication (OWC) with the first node with beam steering based on the assistance information.

Clause 14: The method of Clause 13, wherein the assistance information is transmitted on a first channel; and the OWC is performed on a second channel.

Clause 15: The method of Clause 14, further comprising exchanging, with the first node over the second channel, control information regarding the assistance information.

Clause 16: The method of Clause 15, wherein exchanging the control information comprises transmitting control information to the first node that indicates at least one of: information regarding assistance information the second node is transmitting or is to transmit; or information regarding assistance information at least a third node is transmitting or is to transmit.

Clause 17: The method of Clause 15, wherein exchanging the control information comprises receiving control information from the first node that indicates at least one of: information regarding capability of the first node to detect or process the assistance information; results of the first node processing the assistance information from the second node or assistance information from at least a third node; or a request for the second node to transmit assistance information.

Clause 18: The method of Clause 14, wherein the assistance information is transmitted at an optical wavelength different from that of the main channel.

Clause 19: The method of any one of Clauses 13-18, wherein participating in the OWC comprises: transmitting information to the first node via an OWC channel; and receiving information from the first node via an RF channel outside of the OFC channel.

Clause 20: An apparatus, comprising: a memory comprising executable instructions; and a processor configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by a processor of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a first node, comprising:
   at least one memory comprising computer-executable instructions; and
   one or more processors configured to execute the computer-executable instructions and cause the apparatus to:
   obtain, from a second node via a first channel, assistance information using at least one optical sensor;
   exchange, with the second node over a second channel different from the first channel, control information regarding the assistance information; and
   participate in optical wireless communication (OWC) with the second node on the second channel with beam steering based on the assistance information.

2. The apparatus of claim 1, wherein the assistance information is obtained by processing an image obtained using the at least one optical sensor.

3. The apparatus of claim 2, wherein the processing is based on error vector magnitude (EVM) measurements.

4. The apparatus of claim 3, wherein the processing involves calculation of a searching gradient based on a distance, within the image, from a current EVM measurement to a reference EVM measurement.

5. The apparatus of claim 4, wherein:
   the at least one optical sensor comprises an array of photo multipliers;
   the array is partitioned into different parts; and
   the searching gradient is calculated based on output from the different parts of the array.

6. The apparatus of claim 1, wherein exchanging the control information comprises receiving control information from the second node that indicates at least one of:
   information regarding assistance information the second node is transmitting or is to transmit; or information regarding assistance information at least a third node is transmitting or is to transmit.

7. The apparatus of claim 1, wherein exchanging the control information comprises transmitting control information to the second node that indicates at least one of:
   information regarding capability of the first node to detect or process the assistance information;
   results of the first node processing the assistance information from the second node or assistance information from at least a third node; or a request for the second node to transmit assistance information.

8. The apparatus of claim 1, wherein the assistance information is obtained at an optical wavelength different from that of the second channel.

9. The apparatus of claim 1, wherein a same photo multiplier is used to obtain the assistance information on the first channel and receive data on the second channel.

10. The apparatus of claim 1, wherein:
the second channel comprises an OWC channel; and
participating in the OWC comprises:
  receiving information from the second node via the OWC channel; and
  transmitting information to the second node via a radio frequency (RF) channel outside of the OWC channel.

11. An apparatus for wireless communication at a second node, comprising:
at least one memory comprising computer-executable instructions; and
one or more processors configured to execute the computer-executable instructions and cause the apparatus to:
  transmit assistance information to a first node via a first channel using at least one optical signal;
  exchange, with the first node over a second channel different from the first channel, control information regarding the assistance information; and
  participate in optical wireless communication (OWC) with the first node on at least the second channel with beam steering based on the assistance information.

12. The apparatus of claim 11, wherein exchanging the control information comprises transmitting control information to the first node that indicates at least one of:
information regarding assistance information the second node is transmitting or is to transmit; or information regarding assistance information at least a third node is transmitting or is to transmit.

13. The apparatus of claim 11, wherein exchanging the control information comprises receiving control information from the first node that indicates at least one of:
information regarding capability of the first node to detect or process the assistance information;
results of the first node processing the assistance information from the second node or assistance information from at least a third node; or a request for the second node to transmit assistance information.

14. The apparatus of claim 11, wherein the assistance information is transmitted at an optical wavelength different from that of the second channel.

15. The apparatus of claim 11, wherein:
the second channel comprises an OWC channel; and
participating in the OWC comprises:
  transmitting information to the first node via the OWC channel; and
  receiving information from the first node via a radio frequency (RF) channel outside of the OWC channel.

16. A method for wireless communications at a first node, comprising:
obtaining, from a second node via a first channel, assistance information using at least one optical sensor;
exchanging, with the second node over a second channel different from the first channel, control information regarding the assistance information; and participating in optical wireless communication (OWC) with the second node on at least the second channel with beam steering based on the assistance information.

17. The method of claim 16, wherein the assistance information is obtained by processing an image obtained using the at least one optical sensor.

18. The method of claim 17, wherein the processing is based on error vector magnitude (EVM) measurements.

19. The method of claim 18, wherein the processing involves calculation of a searching gradient based on a distance, within the image, from a current EVM measurement to a reference EVM measurement.

20. The method of claim 19, wherein:
the at least one optical sensor comprises an array of photo multipliers;
the array is partitioned into different parts; and
the searching gradient is calculated based on output from the different parts of the array.

21. The method of claim 16, wherein exchanging the control information comprises receiving control information from the second node that indicates at least one of:
information regarding assistance information the second node is transmitting or is to transmit; or information regarding assistance information at least a third node is transmitting or is to transmit.

22. The method of claim 16, wherein exchanging the control information comprises transmitting control information to the second node that indicates at least one of:
information regarding capability of the first node to detect or process the assistance information;
results of the first node processing the assistance information from the second node or assistance information from at least a third node; or
a request for the second node to transmit assistance information.

23. The method of claim 16, wherein the assistance information is obtained at an optical wavelength different from that of the second channel.

24. The method of claim 16, wherein:
the second channel comprises an OWC channel; and
participating in the OWC comprises:
  receiving information from the second node via the OWC channel; and
  transmitting information to the second node via a radio frequency (RF) channel outside of the OWC channel.

25. A method for wireless communications at a second node, comprising:
transmitting assistance information to a first node via a first channel using at least one optical signal;
exchanging, with the first node over a second channel different from the first channel, control information regarding the assistance information; and
participating in optical wireless communication (OWC) with the first node on at least the second channel with beam steering based on the assistance information.

26. The method of claim 25, wherein exchanging the control information comprises transmitting control information to the first node that indicates at least one of:
information regarding assistance information the second node is transmitting or is to transmit; or
information regarding assistance information at least a third node is transmitting or is to transmit.

27. The method of claim 25, wherein exchanging the control information comprises receiving control information from the first node that indicates at least one of:

information regarding capability of the first node to detect or process the assistance information; or a request for the second node to transmit assistance information.

28. The method of claim 25, wherein exchanging the control information comprises receiving control information from the first node that indicates results of the first node processing the assistance information from the second node or assistance information from at least a third node.

29. The method of claim 25, wherein the assistance information is transmitted at an optical wavelength different from that of the second channel.

30. The method of claim 25, wherein:

the second channel comprises an OWC channel; and participating in the OWC comprises:

transmitting information to the first node via the OWC channel; and receiving information from the first node via a radio frequency (RF) channel outside of the OWC channel.

* * * * *